United States Patent [19]

Robertson

[11] 4,162,509
[45] Jul. 24, 1979

[54] NON-CONTACT VELOCIMETER USING ARRAYS

[75] Inventor: Kenneth D. Robertson, Springfield, Va.

[73] Assignee: The United States of America as represented by the Secretary of the Army, Washington, D.C.

[21] Appl. No.: 917,754

[22] Filed: Jun. 21, 1978

[51] Int. Cl.$^2$ .............................................. G01P 3/36
[52] U.S. Cl. ...................................... 356/28; 358/105
[58] Field of Search ........................... 356/28; 358/105

[56] References Cited

U.S. PATENT DOCUMENTS

| 2,967,449 | 1/1961 | Weiss | 356/28 |
|---|---|---|---|
| 3,508,066 | 4/1970 | Agar | 356/28 |
| 3,525,568 | 8/1970 | Dreyfus | 356/28 |
| 3,558,898 | 1/1971 | Block et al. | 356/28 |
| 3,689,157 | 9/1972 | Andermo | 356/28 |
| 3,804,517 | 4/1974 | Meyr et al. | 356/28 |
| 3,804,518 | 4/1974 | Meyr | 356/28 |
| 3,815,994 | 6/1974 | Peckham | 356/4 |
| 3,865,487 | 2/1975 | Andermo | 356/28 |
| 3,885,873 | 5/1975 | Andermo | 356/28 |

Primary Examiner—S. C. Buczinski

Attorney, Agent, or Firm—Thomas O. Maser

[57] ABSTRACT

Apparatus for measuring velocity is disclosed. The apparatus in its preferred embodiment comprises a first lens and a first array of photodiodes and a second lens and a second array of photodiodes. The photodiode arrays are functionally equivalent to low resolution vidcon camera tubes and momentarily store the image. As an object passes beneath the first lens, its image is stored on the photodiode array. The object then passes beneath the second array and the image is stored on the second array. After the image is stored on the second array a correlation is made between the two images by making an element by element comparison of the serial outputs of the two arrays. Instead of relying on the storage properties of the arrays to make the correlation, the arrays can be read into a small memory for comparison. Each array is exposed for only a short period of time. The invention includes apparatus for controlling the time interval between the exposures. If correlation is not achieved, the time interval between exposures is adjusted until correlation is achieved. When correlation is achieved, the velocity is obtained by dividing the distance between the arrays by the time interval between the exposures of the two arrays.

10 Claims, 1 Drawing Figure

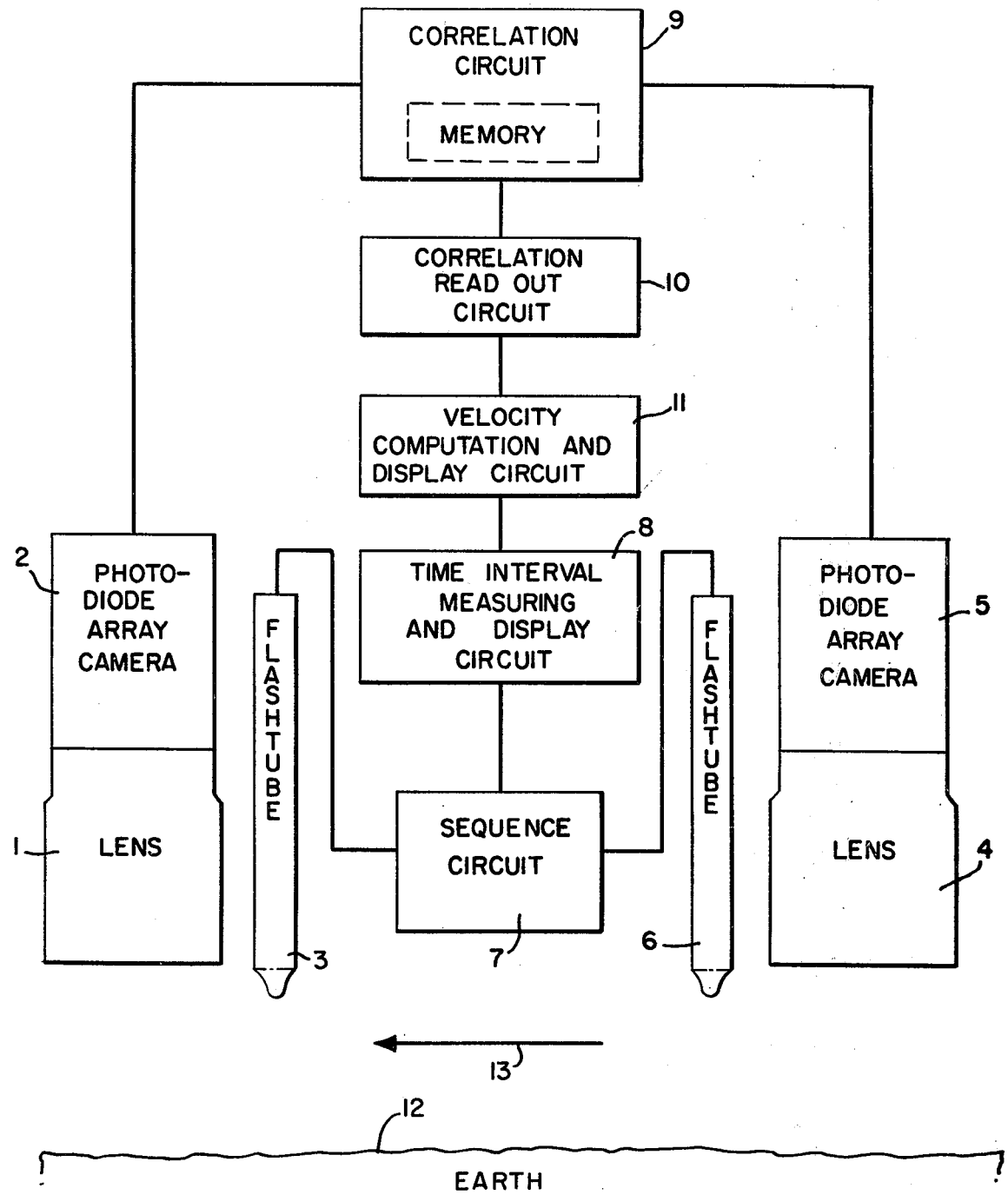

NON-CONTACT VELOCIMETER USING ARRAYS

The invention described herein may be manufactured, used, and licensed by or for the Government for Governmental purposes without the payment to me of any royalties thereon.

BACKGROUND OF THE INVENTION

This invention relates to velocity measuring, and more particularly to a non-contact velocimeter using photodiode arrays.

There are many known ways of measuring velocity. These prior art velocity measuring systems range from purely mechanical automobile type speedometers to complicated laser or radar devices using doppler or speckle patterns.

For simple velocity measurements such as the speed of an automobile, the purely mechanical speedometer is satisfactory for most purposes. However, there are certain applications where accurate measurements of velocity are required. For example, the military has developed jeep mounted and airborne mounted Position and Azimuth Determining Systems (PADS) which use inertial techniques to determine position. A serious source of error in an inertial system is drift of the accelerometer which can cause large errors if not periodically corrected. The correction for this drift is obtained from knowledge of the velocity of the system. One way of determining the velocity is to stop the vehicle carrying the system so that the velocity becomes zero. While such a procedure is practical but cumbersome with a jeep mounted system, it is obvious that such a procedure is not possible with an airborne system. Further, while a contacting type velocimeter may be used with a jeep, a velocimeter requiring contact with the earth would obviously not be suitable for an airborne system. Thus, contact velocimeters, which generally are not sufficiently accurate for position determining systems, are totally worthless in an airborne system.

Other known types of prior art velocimeters used require that periodic markings be placed on the object being measured. This type of prior art system is often used in paper mills, printing plants and the like. Obviously such a system cannot be used in a position determining system since the ground cannot be marked. Another prior art system that is not practical, particularly for use in vehicle mounted position and azimuth determining systems, are the microwave doppler systems. Microwave doppler systems are generally expensive and are necessarily heavy. Because of the problems and deficiencies of the prior art systems described above, designers of position and azimuth determining systems have benerally selected a laser technique that utilizes the speckle pattern produced when coherent light is reflected from a surface for velocity measurements.

This invention provides a velocimeter that is ideally suited for use in a position and azimuth determining system. The velocimeter of this invention is highly accurate, does not require any mechanical contact with the ground, is simple in design, highly reliable, relatively inexpensive, and is light in weight. Further, as compared to the laser type devices used in prior PADS, the apparatus of this invention does not require a coherent light source, is less expensive and considerably simpler in design. While the apparatus of this invention was specifically designed for use with a position and azimuth determining system, the velocimeter of this invention has general utility particularly in applications where highly accurate velocity measurements are required.

SUMMARY OF THE INVENTION

This invention relates to a non-contact velocimeter using arrays. The apparatus of this invention provides a highly accurate measurement of velocity. The preferred embodiment includes a first lens and a first photodiode array and a second lens and a second photodiode array. The first lens and photodiode array is spaced apart from the second lens and photodiode array by a known distance. In using the apparatus there is relative movement between the lenses and the arrays and the object being measured or sensed by the arrays. That is, either the object being sensed is stationery with the arrays moving, or the arrays are stationery with the object moving. The direction of this relative movement is usually in line with the orientation of the arrays.

The first array is exposed for a short period of time to the object being sensed and an image is stored on the first array. At some known time later, the second array is exposed to the object and an image is stored on the second array. Since there is relative movement between the arrays and the object being measured and since the arrays are spaced apart in the direction of this relative movement, the second array will have been exposed to the identical object to which the first array was exposed provided that the second array was exposed at precisely the right time after the first array was exposed. This right time is of course directly related to the velocity of the arrays if the arrays are moving or the velocity of the object if the object is moving.

The images stored in the first and second arrays are correlated by making an element by element comparison of the serial outputs from the two arrays. If correlation is achieved, the velocity of the moving body is computed by dividing the distance between the arrays by the time between exposures of the two arrays. If correlation is not present, the time interval between exposures of the two arrays is adjusted until correlation is achieved. This invention includes apparatus for performing the correlation and may include circuitry for automatically computing the velocity. This computation may of course also be accomplished manually from the known parameters of distance and time interval.

The invention also includes apparatus for controlling the time interval and for measuring and displaying the time interval. In addition, in an alternate embodiment, the arrays are read into a memory and correlation is made out of the memory. By using a memory, the system does not rely on the storage properties of the arrays.

BRIEF DESCRIPTION OF THE DRAWING

A full and complete understanding of the invention can be obtained from the following detailed description when read in conjunction with the annexed drawing in which the single FIGURE shows a preferred embodiment of the invention.

DETAILED DESCRIPTION OF THE INVENTION

As has been mentioned above, the velocimeter of this invention was designed to be used with a jeep or airborne mounted position and azimuth determining system. Therefore, in the following detailed description of the invention, it is assumed that the apparatus shown in the single figure of the drawing is mounted in a jeep.

Referring now specifically to the drawing, the non-contact velocimeter of the invention includes a first lens 1, a first photodiode array camera 2, a first flash tube 3, a second lens 4, a second photodiode array camera 5 and a second flash tube 6. Photodiode array cameras 2 and 5 are essentially the functional equivalent of a low resolution vidcon camera. Each of the photodiode array cameras 2 and 5 contain a solid state image sensor array. For example, suitable arrays that can be used for array cameras 2 and 5 are manufactured and sold by the Reticon Company. Specifically, the Reticon RA 32×32 array is a particularly suitable array for use in array cameras 2 and 5. The Reticon RA 32×32 array is a two dimensional self-scanned optical sensor array consisting of 1024 silicon photodiodes in a 32×32 matrix.

Flash tubes 3 and 6 are coupled to the sequence circuit 7. First the leading flash tube is energized by sequence circuit 7 for a period of time and then after an adjustable period, an interval of time, the following flash tube is energized. Sequence circuit 7 is adjustable such that the interval of time between the energization of the two flash tubes is adjustable. Sequence circuit 7 is coupled to a time interval measuring and display circuit 8. Time interval display circuit 8 measures and displays the time interval between the energization of flash tubes 3 and 6.

Photodiode array cameras 2 and 5 are coupled to the correlation circuitry 9. The output of correlation circuitry 9 is coupled to a correlation read out circuit. A velocity computation and display circuit, which as is explained later herein, is optical, is coupled to correlation read out circuit 10 and to time interval measuring and display circuit 8.

The apparatus of the invention is mounted in a jeep or an airplane such that the lenses 1 and 4 are pointed toward the earth 12. As the jeep or airplane moves above the earth's surface different areas of the earth's surface will pass under the lenses 1 and 4. Lenses 1 and 4 are adjusted such that the earth's surface images picked up by lenses 1 and 4 are focused on the photodiode arrays of photodiode array cameras 2 and 4.

For purposes of describing the operation of the apparatus of this invention, it is assumed that the jeep is moving in the direction of the arrow 13. Sequence circuit 7 first energizes flash tube 3 for a short time period. When flash tube 3 is energized, the photodiode array of photodiode array camera 2 is exposed to the area of the earth's surface then under lens 1 and an image of this area is stored in the photodiode array. At some time interval later, as determined by sequence circuit 7, flash tube 6 is energized for a short period of time. When flash tube 6 is energized, the photodiode array camera 5 is exposed to the area of the earth's surface then under lens 4 and an image of this area is stored on the photodiode array of array camera 5. A correlation between the two images stored in array cameras 2 and 5 is then made by correlation circuit 9. Correlation circuit 9 makes an element by element comparison of the serial outputs of the two arrays. This correlation is made by summing the absolute values of the differences between corresponding elements of the photodiode arrays of array cameras 2 and 5. Instead of a simple summing of the absolute values of the differences between corresponding elements of the two arrays, correlation circuit 9 may be any known correlation circuitry that operates to compare corresponding elements of two arrays. The output of correlation circuit 9 is applied to correlation read out circuit 10 which indicates whether or not a correlation between the images on the two arrays has in fact been achieved. If a correlation between the images has not been achieved, sequence circuit 7 is adjusted to adjust the time interval between the energization of flash tubes 3 and 6 until a correlation is achieved.

When correlation between the images is achieved, the image stored on the photodiode array of array camera 2 is identical to the image stored on the photodiode array of array camera 5. In other words correlation is achieved when the photodiode array of array 5 is exposed to the same area of the earth's surface to which the photodiode array of array camera 2 had previously been exposed. Such correlation can only be achieved if the time interval between exposures (between energization of flash tubes 3 and 6) is properly set relative to the speed of the vehicle carrying the apparatus. Thus, when correlation is achieved, the velocity of the vehicle carrying the apparatus is equal to the distance between the photodiode arrays of array cameras 2 and 5 divided by the time interval between the exposures of the photodiode arrays. After the apparatus is mounted in the vehicle, the distance between the arrays is measured and remains fixed. Therefore, the distance between arrays is known. The time interval between exposures of the two photodiode arrays is displayed by time interval and display circuit 8. Thus, the computation of the velocity is an arithmetic process of division that can be calculated by hand. Instead of performing the calculation by hand, the velocity computation is preferably accomplished electronically by means of velocity computation and display circuit 11. When a correlation is achieved, correlation read out circuit 10 produces an output that conditions velocity computation and display circuit to perform the necessary computation. The distance between the photodiode arrays is pre-set and stored in velocity computation circuit 11. When velocity computation and display circuit 11 is conditioned by correlation read out circuit 10, velocity computation and display circuit 11 accepts a time interval signal from time interval measuring and display circuit 8 and divides the distance by this time interval signal to obtain the velocity. The computed value of the velocity is then displayed on the display post of velocity computation and display circuit 11. Since all of the circuits and elements of this invention are well known circuits and elements, the invention has been illustrated in block diagram form in the drawing.

Instead of relying on the storage properties of the photodiode arrays of array cameras 2 and 5, the image on each array can be immediately read out and stored in a memory. This memory can be part of correlation circuit 9 as is illustrated by the memory 14 shown in the dashed line block in correlation circuit 9. Memory 14 can of course be a separate circuit. When a correlation check is to be made the information stored in memory 14 is inputed into correlation circuit 9.

In addition to modifying the apparatus of this invention by adding memory 14, it should be obvious to those skilled in the art that other changes and modifications can be made to the apparatus shown in the drawing. For example, instead of using flash tubes 3 and 6, a continuous light source, including available light, can be used if shutter arrangements are provided with photodiode array cameras 2 and 5. If such shutters are provided with a continuous light source, sequence circuit 7 will control the opening and closing of the shutters. Further, instead of using shutters, sequence circuit 7 can be used to turn the arrays on and off at the proper times. Either of these latter arrangements would be preferred embodiments in an aircraft mounted velocimeter. How the photodiode arrays are exposed is not particularly significant. The significant feature of the invention is that photodiode arrays are exposed to an image at the appropriate times so that a correlation of the two images is obtained.

In addition to the various methods of exposing the arrays, various different array arrangements can be used in the apparatus of this invention. For example, a single large array with different areas of the single array being correlated can be substituted for the two arrays. Such an arrangement is particularly suitable for low velocities such as those encountered with a hovering helicopter where motion may be in two dimensions. Other array and lens arrangements can also be used. Again, the significant feature of the invention is the correlation of two images where the time and distance are known so that velocity can be computed.

The invention has been described with reference to the apparatus of the invention being in motion. The apparatus of this invention can be used in application when the apparatus of the invention is stationary and the object being sensed is moving. For example, the apparatus could be installed over a moving object such as conveyor belts, a moving freight train or on an underpass through which vehicles pass. The moving object must have some distinguishing features. That is, the image from each area of the moving object cannot be identical to every other area since under such conditions correlation would always be achieved. If the object is moving in the direction of arrow 13 in the drawing and the apparatus is stationary, the photodiode array of array camera 5 would be the first array exposed.

While the invention has been described with reference to a preferred embodiment, it will be obvious to those skilled in the art that various changes and modifications in addition to those specifically mentioned can be made without departing from the spirit and scope of the invention as defined in the claims.

I claim:
1. A non-contact velocimeter comprising:
   first means for sensing an image for a first given period of time and for storing the sensed image;
   second means for sensing an image for a second period of time and for storing the sensed image whereby said second means operates at a controllable time interval after the occurance of said first period of time;
   comparison means for comparing the image stored on said first means for sensing and storing an image with the image stored on said means for sensing and storing an image, said comparison means being coupled to said first means for sensing and storing an image and to said second means for sensing and storing an image and providing an output indication of the degree of correlation between said image stored on said first means for sensing and storing an image and said image stored on said second means for sensing and storing an image; and
   adjustable sequence timing means for controlling the length of said controllable time interval, said adjustable sequence timing means being coupled to said first means for sensing and storing an image and to said second means for sensing and storing an image and being adjusted to vary said controllable time until said comparison means provides an output indication of complete correlation between said image stored on said first means for sensing an image and said image stored on said second means for sensing and storing an image whereby velocity is computed by dividing the distance between said first means for sensing and storing an image and said second means for sensing and storing an image by said controllable time interval when said complete correlation has been achieved, said first means for sensing and storing an image being located a known distance from said second means for sensing and storing an image.

2. A non-contact velocimeter as defined in claim 1 wherein said first means for sensing and storing an image comprises a first array camera having a lens and said second means for sensing and storing an image comprises a second array camera having a lens.

3. A non-contact velocimeter as defined in claim 2 wherein said first array camera includes a first photodiode array and said second array camera includes a second photodiode array.

4. A non-contact velocimeter as defined in claim 3 wherein a time interval measuring and display circuit is coupled to said adjustable sequence timing means for measuring and displaying said controllable time interval.

5. A non-contact velocimeter as defined in claim 4 wherein a read out circuit is coupled to said comparison means.

6. A non-contact velocimeter as defined in claim 5 wherein said first means for sensing and storing an image further includes a first flash tube and said second means for sensing and storing an image further includes a second flash tube, said first and second flash tubes being coupled to said adjustable sequence timing means.

7. A non-contact velocimeter as defined in claim 6 wherein a velocity computation circuit is coupled to said read out means and to said time interval measuring and display circuit.

8. A non-contact velocimeter as defined in claim 7 wherein a memory is coupled between said first photodiode array and said comparison means and between said second photodiode array and said comparison means.

9. A non-contact velocimeter as defined in claim 5 wherein a velocity computation circuit is coupled to said read out means and to said time interval measuring and display circuit.

10. A non-contact velocimeter as defined in claim 9 wherein a memory is coupled between said first photodiode array and said comparison means and between said second photodiode array and said comparison means.

* * * * *